(12) United States Patent
Noda et al.

(10) Patent No.: US 12,157,471 B2
(45) Date of Patent: Dec. 3, 2024

(54) SWITCHING CONTROL METHOD AND SWITCHING CONTROL DEVICE

(71) Applicant: NISSAN MOTOR CO., LTD., Yokohama (JP)

(72) Inventors: Takeshi Noda, Kanagawa (JP); Hiromichi Kawamura, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/701,884

(22) PCT Filed: Oct. 21, 2021

(86) PCT No.: PCT/JP2021/039016
§ 371 (c)(1),
(2) Date: Apr. 16, 2024

(87) PCT Pub. No.: WO2023/067781
PCT Pub. Date: Apr. 27, 2023

(65) Prior Publication Data
US 2024/0326821 A1    Oct. 3, 2024

(51) Int. Cl.
*B60W 30/00*       (2006.01)
*B60W 10/00*       (2006.01)
*B60W 10/08*       (2006.01)
*B60W 30/182*      (2020.01)
*B60W 50/14*       (2020.01)

(52) U.S. Cl.
CPC .......... *B60W 30/182* (2013.01); *B60W 10/08* (2013.01); *B60W 50/14* (2013.01); *B60W 2510/186* (2013.01); *B60W 2510/30* (2013.01); *B60W 2520/10* (2013.01); *B60W 2710/08* (2013.01)

(58) Field of Classification Search
CPC .... B60W 30/182; B60W 10/08; B60W 50/14; B60W 2510/186; B60W 2510/30; B60W 2520/10; B60W 2710/08
USPC .......................................................... 701/53
See application file for complete search history.

(56) References Cited

U.S. PATENT DOCUMENTS

| 2014/0145502 A1 | 5/2014 | Sugiyama |
| 2016/0339888 A1 | 11/2016 | Yokoyama et al. |
| 2018/0105163 A1 | 4/2018 | Matsubara et al. |

FOREIGN PATENT DOCUMENTS

| JP | H10-322153 A | 12/1998 |
| JP | 2014-107968 A | 6/2014 |
| JP | 2018-068038 A | 4/2018 |
| JP | 2021-066238 A | 4/2021 |
| JP | 2021-069213 A | 4/2021 |

(Continued)

*Primary Examiner* — Tiffany P Young
(74) *Attorney, Agent, or Firm* — Foley & Lardner LLP

(57) ABSTRACT

In a vehicle including a generator and a drive motor for traveling that operates with generated electric power of the generator, setting a control mode of a carrier frequency used for PWM control for adjusting the electric power of the generator to either of a basic mode or a diffusion mode; acquiring a noise recognition degree suggestion amount suggesting a vehicle situation correlated with a level of a recognition degree of a vehicle user with respect to noise generated by an operation of the generator; executing the diffusion mode in a case where the recognition degree is estimated to be high based on the noise recognition degree suggestion amount; and executing the basic mode in a case where the recognition degree is estimated to be low.

11 Claims, 6 Drawing Sheets

(56) References Cited

FOREIGN PATENT DOCUMENTS

| | | |
|---|---|---|
| JP | 2021-136738 A | 9/2021 |
| WO | WO-2015/115019 A1 | 8/2015 |

SWITCHING CONTROL METHOD AND SWITCHING CONTROL DEVICE

TECHNICAL FIELD

The present invention relates to a switching control method and a switching control device.

BACKGROUND ART

JP2021-136738A discloses an aspect of pulse width modulation (PWM) control for an inverter as a switching device that adjusts electric power supplied to a three-phase AC motor.

In particular, in JP2021-136738A, switching control is proposed in which a control mode of a frequency (carrier frequency) of a carrier wave used for the PWM control is switched between a diffusion mode in which the carrier frequency is changed (diffused) at a predetermined cycle and a basic mode in which the carrier frequency is fixed to a predetermined basic cycle in accordance with a driving point (torque, rotation speed, or the like) set in each of a power running state and a regeneration state of a drive motor used for traveling and driving of a vehicle.

By setting the control mode to the diffusion mode, noise caused by an increase in ripple current of the inverter is suppressed. On the other hand, by setting the control mode to the basic mode, switching loss is reduced and an optimum energy efficiency is ensured. That is, in JP2021-136738A, a scene in which noise suppression is to be prioritized and a scene in which energy efficiency is to be prioritized are distinguished in accordance with the driving point of the drive motor, and an appropriate switching control mode is set for each scene.

SUMMARY OF INVENTION

In recent years, vehicles (so-called series hybrid vehicles) of a type in which driving electric power of a drive motor is covered by generated electric power of a generator have been widely used. In this type of vehicles, since noise is also generated by an operation of the generator, it is desirable to set a control mode to a diffusion mode in order to appropriately suppress the noise. However, an operating point of the generator is basically determined independently of a traveling state of the vehicle. Therefore, even with reference to the operating point of the generator, it is difficult to appropriately determine a scene in which the noise of the generator becomes a problem (for example, a scene in which background noise during traveling is small). That is, in the above-described control in the related art, there is a problem that, in a case where switching control in a series hybrid vehicle equipped with the above-mentioned generator is assumed, it is not possible to distinguish between an appropriate basic mode and an appropriate diffusion mode corresponding to a scene.

Therefore, an object of the present invention is to provide a switching control method and a switching control device capable of appropriately distinguishing between a diffusion mode and a basic mode even when applied to the series hybrid vehicle.

According to an aspect of the present invention, it is provided a switching control method for adjusting, in a vehicle including a generator and a drive motor for traveling that operates with generated electric power of the generator, a carrier frequency of a carrier wave used for PWM control for adjusting the electric power of the generator. The switching control method includes setting, as a control mode of the carrier wave, either of a basic mode in which the carrier frequency is maintained at a predetermined basic value or a diffusion mode in which the carrier frequency is changed at a predetermined switching cycle.

The switching control method also includes acquiring a noise recognition degree suggestion amount suggesting a vehicle situation correlated with a level of a recognition degree of a vehicle user with respect to noise generated by an operation of the generator. The switching control method further includes executing the diffusion mode in which the carrier frequency is changed at a predetermined switching cycle in a case where the recognition degree is estimated to be high based on the noise recognition degree suggestion amount, and executing the basic mode in which the carrier frequency is maintained at a predetermined basic value in a case where the recognition degree is estimated to be low.

DESCRIPTION OF EMBODIMENTS

Hereinafter, embodiments of the present invention will be described with reference to the drawings.

First Embodiment

Figure 1:
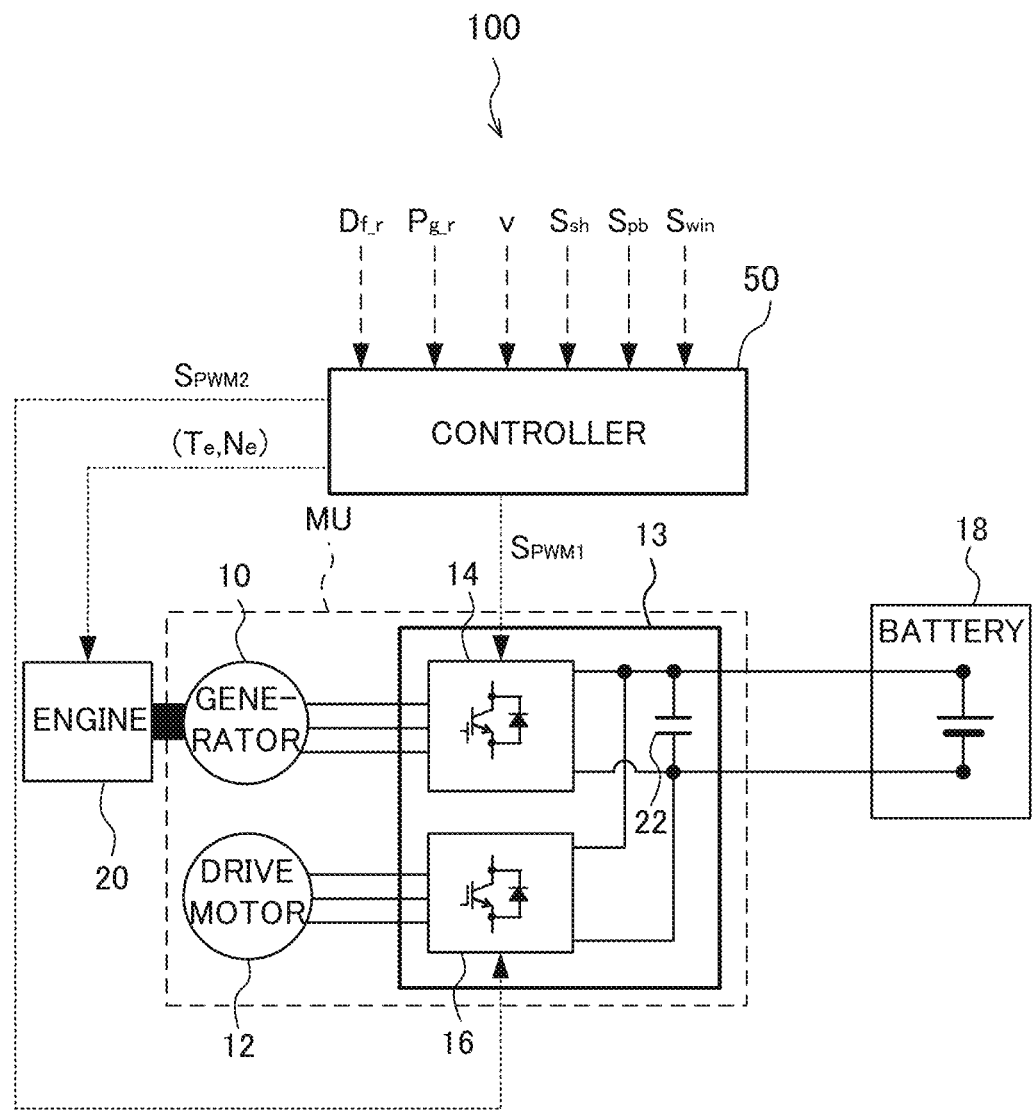
FIG. 1 is a diagram illustrating a vehicle control system in which a switching control method according to an embodiment of the present invention is executed.

FIG. 1 is a diagram illustrating a vehicle control system 100 in which a switching control method of the present embodiment is executed. It is assumed that the vehicle control system 100 of the present embodiment is applied to a hybrid vehicle (for example, a series hybrid vehicle) equipped with a first electric motor (generator 10) for power generation driven by a predetermined drive source (engine 20) and a second electric motor (drive motor 12) for traveling that operates with generated electric power of the first electric motor.

As illustrated in the drawing, the vehicle control system 100 mainly includes the generator 10, the drive motor 12, an inverter 13, a battery 18, the engine 20, and a controller 50. In particular, in the vehicle control system 100 illustrated in the drawing, the generator 10, the drive motor 12, and the inverter 13 are integrated to form an electric motor unit MU.

The generator 10 is implemented by a three-phase AC motor that functions as the above-mentioned first electric motor. In particular, under control of the inverter 13, the generator 10 receives a driving force generated by the engine 20 to generate electric power for driving the drive motor 12, and supplies the electric power to the battery 18 or the drive motor 12. The generator 10 may be implemented to appropriately receive the electric power from the battery 18 to drive the engine 20. As a result, the generator 10 can be used to execute, for example, cranking (motoring) at the time of starting the engine 20.

The drive motor 12 is implemented by a three-phase AC motor that functions as the above-mentioned second electric motor. In particular, under the control of the inverter 13, the drive motor 12 operates (power running operation or regeneration operation) by receiving a supply of electric power for realizing a desired driving force (braking force) from the battery 18 or the generator 10, and applies the driving force (braking force) to a driving wheels of the vehicle via a predetermined transmission mechanism (not illustrated).

The inverter 13 includes a first switching device 14, a second switching device 16, and a smoothing capacitor 22.

The first switching device 14 executes an electric power adjustment (in particular, mutual conversion between direct current and alternating current) between the battery 18 and the generator 10 in accordance with a PWM signal $S_{PWM1}$ input from the controller 50. In particular, the first switching device 14 is implemented by a semi-conductor switching element provided in accordance with each phase and a control unit for operating each switching element in a switching pattern corresponding to the PWM signal $S_{PWM1}$.

The second switching device 16 executes an electric power adjustment (in particular, mutual conversion between direct current and alternating current) between the battery 18 and the drive motor 12 in accordance with a PWM signal $S_{PWM2}$ input from the controller 50. In particular, the second switching device 16 is implemented by a semi-conductor switching element provided in accordance with each phase and a control unit for operating each switching element in a switching pattern corresponding to the PWM signal $S_{PWM2}$.

The smoothing capacitor 22 smoothes a ripple current that may be caused by an operation of the first switching device 14 or the second switching device 16. That is, the smoothing capacitor 22 functions as a capacitive element common to the first switching device 14 and the second switching device 16.

The battery 18 is an in-vehicle DC power supply implemented by a lithium-ion secondary battery or the like.

The engine 20 is connected to the generator 10 via a mechanical element such as a gear (not illustrated), and transmits power for power generation to the generator 10. That is, the engine 20 is used as a drive source for power generation by the generator 10. Under control of the controller 50, the engine 20 operates at an operating point (engine torque $T_e$ and the number of engine revolution $N_e$) determined based on a required generated electric power $P_{g\_r}$.

Next, a configuration of the controller 50 will be described. The controller 50 is implemented by a computer including a central processing unit (CPU), a read-only memory (ROM), a random access memory (RAM), and an input/output interface (an I/O interface) and programmed to execute respective processes to be described later. The controller 50 can be implemented by a plurality of pieces of computer hardware that execute the respective processes in a distributed manner.

In particular, the controller 50 determines a generator torque $T_g$ and a rotation speed $N_g$, which are the driving points of the generator 10, in accordance with the desired required generated electric power $P_{g\_r}$. The required generated electric power $P_{g\_r}$ is determined to an appropriate value based on a battery remaining charged electric power and other vehicle states (a request for sound vibration suppression, a request for a catalyst warming-up device of the engine 20, or the like). In addition, the controller 50 determines a drive motor torque Ta and a rotation speed Na, which are driving points of the drive motor 12, in accordance with a required driving force $D_{f\_r}$ for the vehicle. The required driving force Der is determined based on an operation amount (accelerator position (accelerator opening degree)) for an accelerator pedal mounted on the vehicle, a command from a host controller such as an automatic driving control device (not illustrated), or the like.

Here, the controller 50 adjusts a carrier frequency $f_{c2}$ (generally, about several kHz to several tens of kHz) of the carrier wave used for generating the PWM signal $S_{PWM2}$ based on the driving points (Ta and Na) of the drive motor 12. More specifically, the controller 50 specifies a scene in which noise suppression is to be prioritized and a scene in which switching efficiency is to be prioritized based on the driving points (Ta and Na) of the drive motor 12, and adjusts the carrier frequency $f_{c2}$ in accordance with each scene. For example, in a case where the driving points (Ta and Na)) indicating a scene in which noise caused by an operation of the drive motor 12 becomes a problem (such as the number of low rotation ranges within which background noise during traveling becomes small) is set, the controller 50 changes the carrier frequency $f_{c2}$ to reduce sound vibration (diffusion mode), and in other cases, the controller 50 fixes the carrier frequency $f_{c2}$ to increase the switching efficiency (basic mode).

On the other hand, the controller 50 sets a control mode for adjusting a carrier frequency $f_{c1}$ (generally, about several kHz to several tens of kHz) of the carrier wave used for generating the PWM signal $S_{PWM1}$ related to control of the generator 10 (switching control of the first switching device 14).

In particular, the controller 50 of the present embodiment executes a process for determining whether the control mode of the first switching device 14 is to be set to either of the diffusion mode or the basic mode by using a noise recognition degree suggestion amount to be described later as an input (hereinafter, also referred to as an "execution determination process"). More specifically, based on the noise recognition degree suggestion amount, the controller 50 estimates whether a recognition degree of a vehicle user O (in particular, an occupant of the vehicle) with respect to noise caused by an operation of the generator 10 is high or low, and determines a final control mode in accordance with an estimation result.

Here, the noise recognition degree suggestion amount is a parameter indicating a vehicle situation correlated with the recognition degree of the vehicle user O with respect to the noise of the generator 10, in particular, a degree of auditory recognition (degree of ease of hearing). That is, the noise recognition degree suggestion amount is a parameter that defines a vehicle situation (presence or absence of a noise shield, a stop state over a certain period of time, or the like) that affects the ease of hearing to noise accompanying the operation of the generator 10 for the vehicle user O located in a vehicle compartment $C_{in}$ or a peripheral region outside the vehicle (hereinafter, also referred to as "vehicle exterior region $C_{out}$").

In particular, the noise recognition degree suggestion amount of the present embodiment includes: an alighting possibility parameter suggesting a possibility that the vehicle user O will get off when the vehicle is stopped; a background noise parameter suggesting a magnitude of background noise (traveling noise, wind noise, or the like) in the vehicle compartment $C_{in}$ during traveling; and a first shielding property parameter suggesting a level of shielding property (presence or absence of a physical shielding object) against noise transmission between the vehicle compartment $C_{in}$ and a noise source (electric motor unit MU).

More specifically, the controller 50 acquires a shift position signal $S_{sh}$ and a pb state signal $S_{pb}$ as the above-mentioned alighting possibility parameter, a vehicle speed v detected or estimated by sensors (not illustrated) as the above-mentioned background noise parameter, and an open and closed state signal $S_{win}$ as the first shielding property parameter.

The shift position signal $S_{sh}$ is a signal indicating a shift position selected in the vehicle, and is generated based on a detection value of a shift position sensor (not illustrated). In addition, the pb state signal $S_{pb}$ is a signal indicating an ON/OFF state of the parking brake, and is generated based on a detection value of a parking brake sensor (not illustrated). Further, the open and closed state signal $S_{win}$ is a signal indicating an open and closed state of a window of the vehicle, and is generated based on a detection value of a sensor (not illustrated) or a window position calculation value calculated based on a current of a power window motor.

In the present embodiment, the expression "a recognition degree with respect to noise caused by an operation of the generator 10 is high" means a state in which the vehicle user O located in the vehicle compartment $C_{in}$ or the vehicle exterior region $C_{out}$ recognizes noise more strongly than or equal to a certain reference (a state in which there is an unacceptable uncomfortable feeling with respect to the noise). On the other hand, the expression "a recognition degree with respect to noise caused by an operation of the generator 10 is low" means a state in which a degree of recognition of the vehicle user O with respect to the noise is lower than a certain reference (a state in which the vehicle user O cannot recognize the noise or the vehicle user O can recognize the noise but does not feel uncomfortable). In particular, as a reference for distinguishing the level of the above-mentioned recognition degree, for example, the recognition degree can be determined quantitatively or qualitatively as appropriate by an experiment or a simulation based on, for example, a sensitivity evaluation of a plurality of vehicle users O, or an analysis result of a relative magnitude of a noise component derived from the generator 10 with respect to all sound components (including the background noise and the like) in the vehicle compartment $C_{in}$ or the vehicle exterior region $C_{out}$.

The controller 50 executes either of the basic mode or the diffusion mode determined based on a result of the above-mentioned execution determination process to generate the PWM signal $S_{PWM1}$.

More specifically, the controller 50 generates the PWM signal $S_{PWM1}$ based on a result of magnitude comparison between the carrier wave of the carrier frequency $f_{c1}$ corresponding to the control mode determined by the above-mentioned execution determination process and a voltage command value $V_g^*$ determined in accordance with the driving points ($T_g$ and $N_g$) of the generator 10. On the other hand, the controller 50 generates the PWM signal $S_{PWM2}$ based on a result of magnitude comparison between the carrier wave of the carrier frequency $f_{c2}$ determined in accordance with the driving points ($T_d$ and $N_d$) of the drive motor 12 described above and a voltage command value $V_d^*$ determined in accordance with the driving points (Ta and Na).

More specifically, the controller 50 compares a magnitude relation between the voltage command value ($V_g^*$ and $V_d^*$) and the carrier wave, and repeatedly executing operations of outputting an OFF signal (or an ON signal) when an instantaneous value of the carrier wave is equal to or greater than the voltage command value, and outputting an ON signal (or an OFF signal) when the instantaneous value becomes lower than the voltage command value, thereby generating the PWM signal ($S_{PWM1}$ and $S_{PWM2}$).

In particular, in the above-mentioned basic mode, the carrier frequency ($f_{c1}$ and $f_{c2}$) is set (fixed) to a fundamental frequency F0 corresponding to twice a control cycle t of the voltage command value ($V_g^*$ and $V_d^*$). In this manner, by fixing the carrier frequency ($f_{c1}$ and $f_{c2}$), loss due to switching is reduced, and a decrease in energy efficiency (fuel efficiency) is suppressed. On the other hand, in a case of a basic mode in which a single carrier frequency ($f_{c1}$ or $f_{c2}$) is set, a ripple current may concentrate at a predetermined frequency, and a ripple voltage level of the frequency may increase. Therefore, the diffusion mode is set in the scene in which the ripple current is to be suppressed.

In the diffusion mode, as the carrier frequency (fc and $f_{c2}$), the fundamental frequency F0 (first frequency) and a diffusion frequency F1 (second frequency) which is an integral multiple of the fundamental frequency F0 are alternately set.

Figure 2:
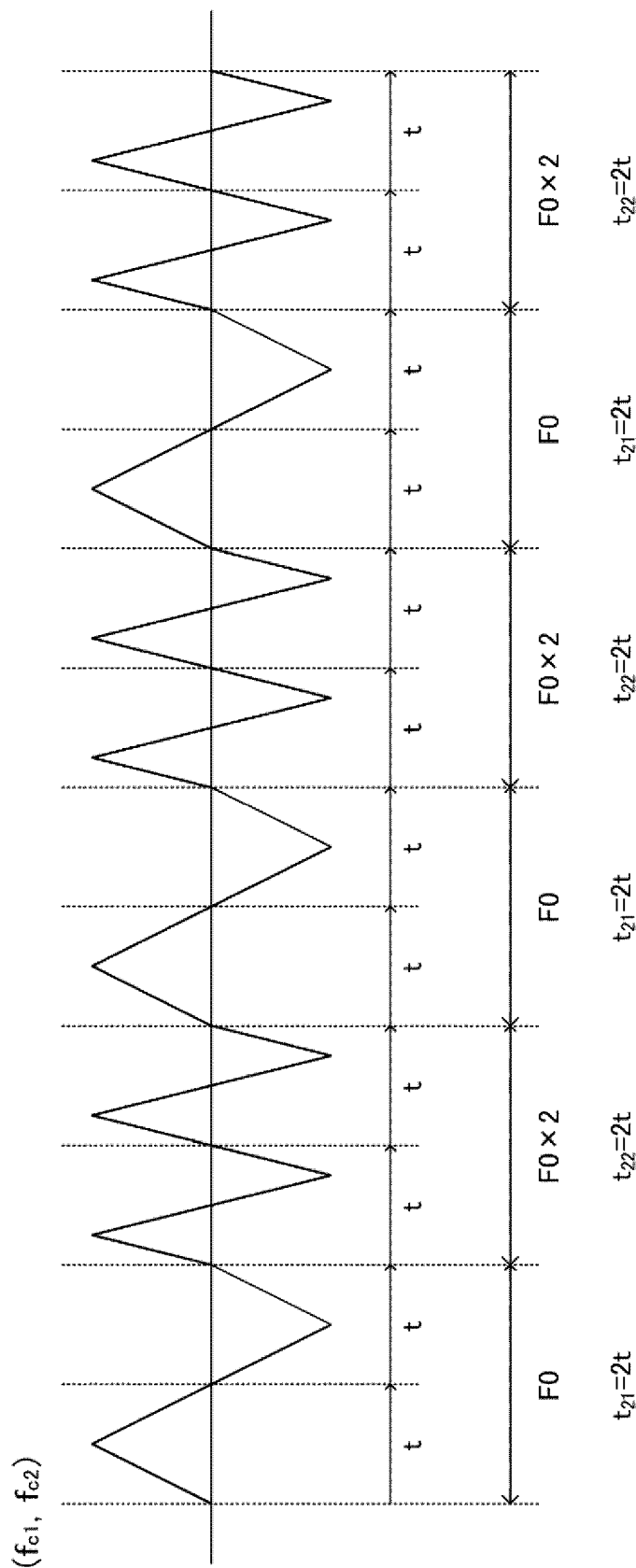
FIG. 2 is a diagram illustrating an example of a setting mode of a carrier frequency in a diffusion mode.

FIG. 2 is a diagram illustrating an example of a setting mode of the carrier frequency ($f_{c1}$ and $f_{c2}$) in the diffusion mode. In the example illustrated in FIG. 2, the diffusion frequency F1 is set to twice the fundamental frequency F0. In addition, in the diffusion mode, a time for setting the fundamental frequency F0 (first switching time $t_{21}$) is set to twice the control cycle t. Further, a time for setting the diffusion frequency F1 (second switching time $t_{22}$) is also set to twice the control cycle t.

Accordingly, in the example illustrated in FIG. 2, in the diffusion mode, the carrier frequency ($f_{c1}$ and $f_{c2}$) is alternately repeated every twice the control cycle t between the fundamental frequency F0 and the diffusion frequency F1.

The diffusion frequency F1 is not limited to twice the fundamental frequency F0. That is, the diffusion frequency F1 can be appropriately set to any value as long as the value is different from the fundamental frequency F0 (in particular, a value greater than the fundamental frequency F0). However, the diffusion frequency F1 is preferably set to an integral multiple such as twice, three times, or four times the fundamental frequency F0. By setting a cycle of the carrier wave (the reciprocal of each of the fundamental frequency F0 and the diffusion frequency F1) to an integral multiple of the control cycle t in this manner, it is possible to suppress a change in a difference (phase difference) between a switching timing of a carrier frequency fc and an update timing of the voltage command value ($V_g^*$ and $V_d^*$), and suitably synchronize the carrier wave with the voltage command value ($V_g^*$ and $V_d^*$). Therefore, in the first switching device 14, it is possible to suppress a decrease in torque accuracy and generation of a torque ripple at the time of switching the carrier frequency. In particular, it is preferable to synchronize the carrier wave with the voltage command value ($V_g^*$ and $V_d^*$) to make the phase difference therebetween zero.

The first switching time $t_{21}$ and the second switching time $t_{22}$ may be appropriately set in addition to those illustrated in FIG. 2. In particular, the first switching time $t_{21}$ and the second switching time $t_{22}$ may be set to values different from each other.

Further, the switching of the carrier frequency ($f_{c1}$ and $f_{c2}$) in the diffusion mode can be executed when the instantaneous value of the carrier wave reaches a position where is the middle (zero point) of an amplitude of the carrier wave, and it is also possible to execute the switching when the instantaneous value reaches a position where the amplitude of the carrier wave reaches a peak (maximum value or minimum value).

By executing the above-described diffusion mode, an increase in ripple voltage caused by concentration of the carrier frequencies ($f_{c1}$ and $f_{c2}$) at a specific frequency is suppressed. Accordingly, the noise caused by the operations of the drive motor 12 and the generator 10 can be suppressed.

Next, further details of the above-described execution determination process according to the present embodiment will be described.

Figure 3:
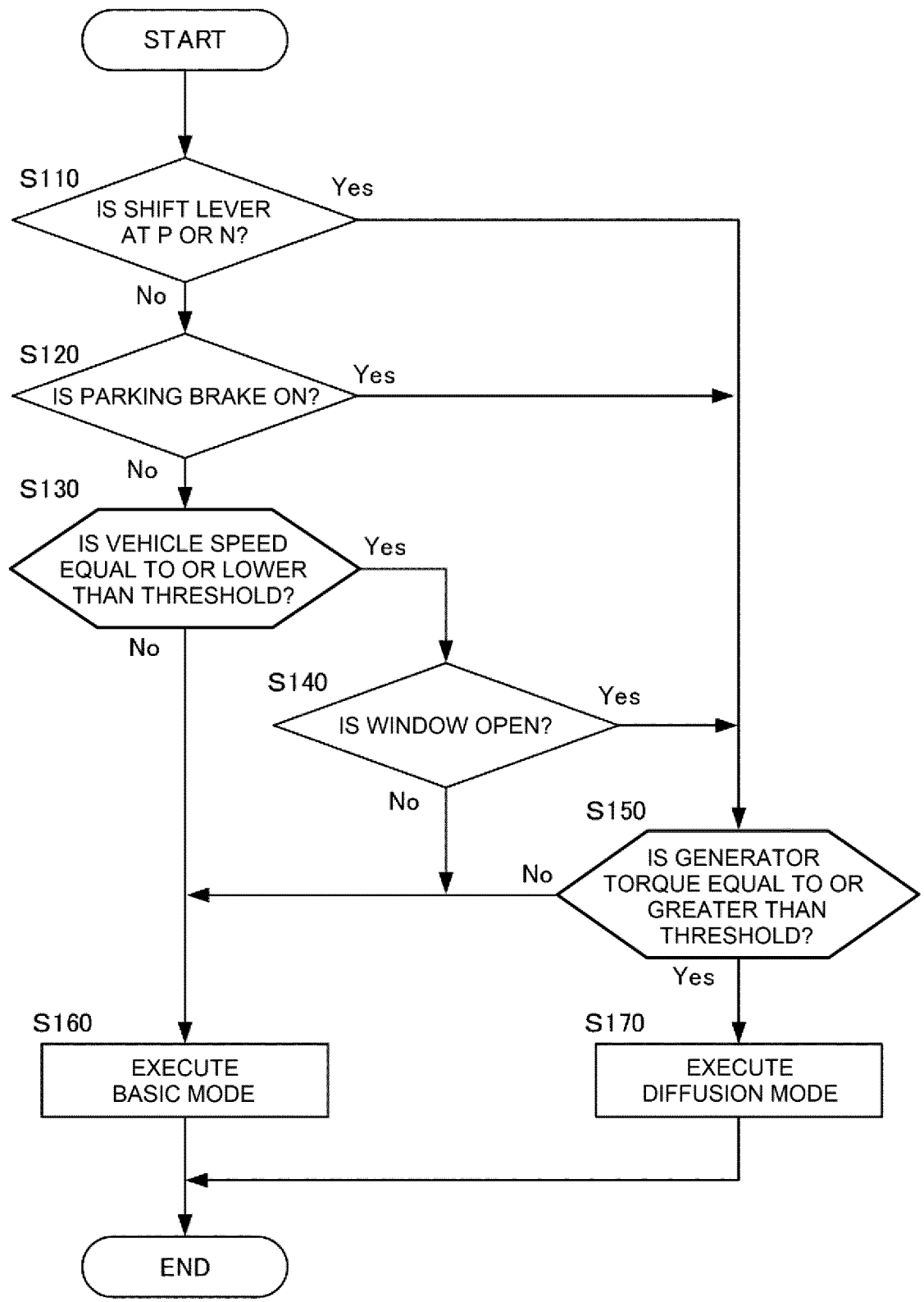
FIG. 3 is a flowchart illustrating an execution determination process according to a first embodiment.

FIG. 3 is a flowchart illustrating the execution determination process according to the present embodiment. The controller 50 repeatedly executes a routine illustrated in FIG. 3 at predetermined control cycles.

First, the controller 50 executes, based on the shift position signal $S_{sh}$ and the pb state signal $S_{pb}$, determination of whether the shift position selected in the vehicle is either of a parking position (so-called "P" position) or a neutral position (so-called "N" position) (step S110), and determination of whether the parking brake is in a state of being operated (step S120).

In a case where both determination results of step S110 and step S120 are negative (in a case where it is determined that there is an alighting possibility of the vehicle user O), the controller 50 executes the process of step S130. On the other hand, in a case where at least one of the determination results of step S110 and step S120 is positive (in a case where it is determined that there is no alighting possibility of the vehicle user O), the controller 50 executes the process of step S150.

The above-mentioned step S110 and step S120 are executed to estimate and determine whether there is a possibility that the vehicle user O in the vehicle compartment $C_{in}$ will get off when the vehicle is stopped. That is, in the present embodiment, the shift position signal $S_{sh}$ and the pb state signal $S_{pb}$ are used as the above-described alighting possibility parameter. In particular, in addition to identification of a stop scene of the vehicle, the shift position signal $S_{sh}$ and the pb state signal $S_{pb}$ function as preferable indices capable of extracting a stop situation in which the alighting possibility is high (stop for a relatively long time such as parking) by excluding a stop situation in which the alighting possibility of the vehicle user O is low (stop for a relatively short time such as waiting for a traffic light) in the identified stop scene.

Figure 4A:
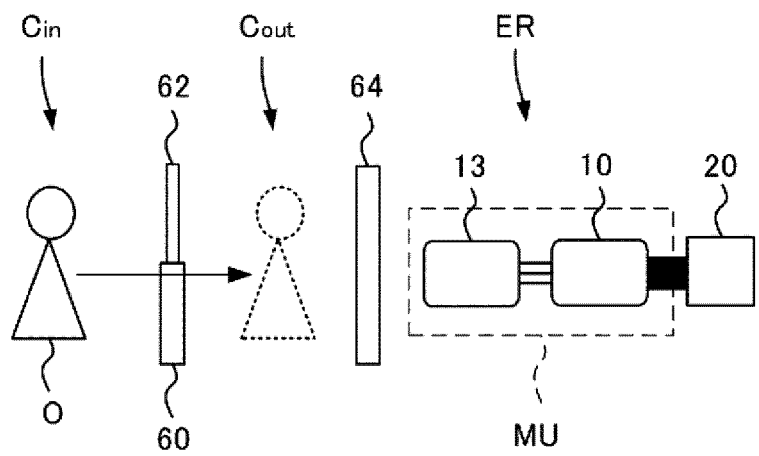
FIG. 4A is a diagram illustrating a correlation between an alighting possibility of a vehicle user when the vehicle is stopped and a level of a recognition degree for noise of the vehicle user.

FIG. 4A is a diagram illustrating a relation between the alighting possibility of the vehicle user O when the vehicle is stopped and a level of the recognition degree for noise of the vehicle user O. In FIG. 4A, an example is assumed in which the electric motor unit MU including the inverter 13 is accommodated in the same accommodation space (engine room ER) in the vehicle body together with the engine 20, and the engine room ER is implemented to be openable and closable with respect to the vehicle exterior region $C_{out}$ by the engine hood 64.

In the above-described stop situation in which the alighting possibility is high, it is assumed that the vehicle user O in the vehicle compartment $C_{in}$ moves to the vehicle exterior region $C_{out}$ as illustrated in the drawing. In this case, a physical distance between the vehicle user O and the electric motor unit MU as the noise source is reduced, and a shielding function by a vehicle door 60 and a window 62f is also lost (the shielding object is substantially only the engine hood 64). Therefore, the determination related to the alighting possibility based on the above-mentioned step S110 and step S120 is a logic capable of appropriately estimating the level of the recognition degree for noise.

Returning to FIG. 3, in step S130, the controller 50 executes magnitude comparison between the vehicle speed v as the background noise parameter and a predetermined vehicle speed threshold $V_{th}$. When it is determined that the vehicle speed v exceeds the vehicle speed threshold $V_{th}$ (when a level of the background noise is equal to or higher than a certain level), the controller 50 sets the control mode to the basic mode and ends the routine (step S160). On the other hand, when it is determined that the vehicle speed v is equal to or lower than the vehicle speed threshold $V_{th}$ (when the level of the background noise is 1 equal to or lower than the certain level), the controller 50 executes the process of step S140.

The vehicle speed threshold $v_{th}$ is determined in advance by an experiment or a simulation, and is stored in any storage area accessible by the controller 50.

Next, in step S140, the controller 50 refers to the above-mentioned open and closed state signal $S_{win}$ to determine whether the window 62 of the vehicle is open. When it is determined that the window 62 is not open, the controller 50 sets the control mode to the basic mode and ends the routine (step S160). On the other hand, when it is determined that the window 62 is open, the controller 50 executes the process of step S150.

Here, the determination in step S140 is executed to estimate the level of the recognition degree of the vehicle user O with respect to the noise with reference to the shielding property against noise transmission from the electric motor unit MU to the vehicle compartment $C_{in}$ on an assumption that the background noise during traveling is equal to or higher than a certain level. That is, in the present embodiment, the open and closed state signal $S_{win}$ indicating the open and closed state of the window 62 of the vehicle is used as the first shielding property parameter described above. In particular, the open and closed state signal $S_{win}$ functions as an appropriate index for estimating the level of the shielding property against noise transmission from the inverter 13 to the vehicle compartment $C_{in}$.

Figure 4B:
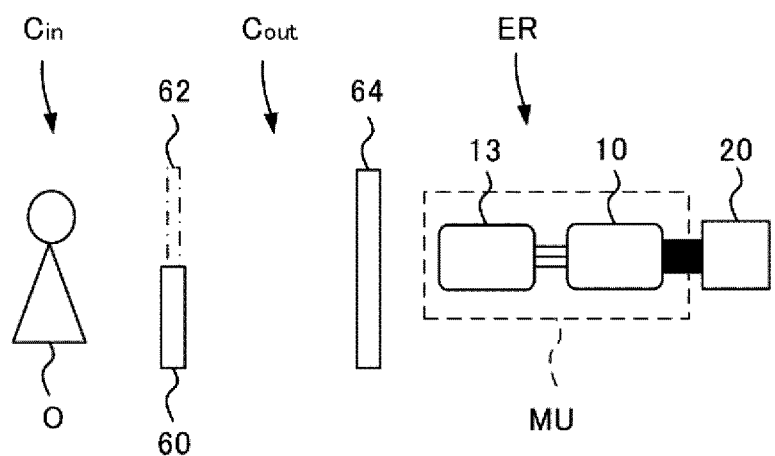
FIG. 4B is a diagram illustrating a correlation between an open and closed state of a window of the vehicle and the level of the recognition degree for noise of the vehicle user.

FIG. 4B is a diagram illustrating a relation between the open and closed state of the window 62 of the vehicle and the recognition degree for noise in the vehicle compartment $C_{in}$.

As illustrated in the drawing, in a case where the window 62 of the vehicle is open during traveling, substantially only the engine hood 64 is a shield that shields the noise transmission between the vehicle compartment $C_{in}$ and the inverter 13. That is, it can be said that for the vehicle user O in the vehicle compartment $C_{in}$, the state in which the window 62 is open is a state in which the recognition degree with respect to the noise is high as compared to a state in which the window 62 is closed. In particular, the open and closed state of the window 62 on an assumption that the background noise is equal to or higher than the certain level appropriately correlates with the level of the recognition degree for noise of the vehicle user O (whether there is an uncomfortable feeling with respect to the noise).

Returning to FIG. 3, in step S150, the controller 50 executes magnitude comparison between the generator torque $T_g$ and the threshold torque $T_{g\_th}$. In a case where the generator torque $T_g$ is equal to or greater than the predetermined threshold torque $T_{g\_th}$, the controller 50 executes the diffusion mode and ends the routine (step S170). On the other hand, in a case where the generator torque $T_g$ is less than the threshold torque $T_{g\_th}$, the controller 50 sets the control mode to the basic mode and ends the routine (step S160).

Here, depending on the magnitude of the generator torque $T_g$ (~ a current flowing through the generator 10), a scene in which the noise does not reach a level that causes discomfort of the vehicle user O is assumed. The determination in step S150 is executed to specify such a scene. In particular, with a determination logic according to step S150, it is possible to execute the basic mode regardless of a determination result of the level of the recognition degree for noise in a scene in which the noise level is small to such a degree that does not cause a problem.

The threshold torque $T_{g\_th}$ is determined in advance by an experiment or a simulation as an appropriate generator torque $T_g$ from the viewpoint of specifying the above-mentioned scene, and is stored in any storage area accessible by the controller 50.

Also assuming a regeneration operation ($T_g<0$) of the generator 10, a control logic such as executing comparison between an absolute value of the generator torque $T_g$ and the threshold torque $T_{g\_th}$ may be adopted in the determination of step S150.

According to the switching control method of the present embodiment described above, the following operations and effects are obtained.

According to the present embodiment, a switching control method is provided for adjusting, in the vehicle including the generator 10 and the drive motor 12 for traveling that operates with the generated electric power of the generator 10, the carrier frequency $f_{c1}$ of the carrier wave used in the PWM control for adjusting the electric power of the generator 10.

In the switching control method, either of a basic mode in which the carrier frequency $f_{c1}$ is maintained at a predetermined basic value (fundamental frequency F0) or a diffusion mode in which the carrier frequency $f_{c1}$ is changed at a predetermined switching cycle is set as the control mode of the carrier wave. The noise recognition degree suggestion amount ($S_{sh}$, $S_{pb}$, v, and $S_{win}$) indicating the vehicle situation correlated with the level of the recognition degree of the vehicle user O with respect to the noise generated by the operation of the generator 10 is acquired. In a case where the above-mentioned recognition degree is estimated to be high based on the noise recognition degree suggestion amount (Yes in either of step S110 and step S120 or Yes in both step S130 and step S140), the diffusion mode is executed (step S170). On the other hand, in a case where the above-mentioned recognition degree is estimated to be low (No in both step S110 and step S120 and No in either of step S130 or step S140), the basic mode is executed (step S160).

Accordingly, it is possible to determine the control mode related to the carrier frequency $f_{c1}$ of the carrier wave based on a determination criterion of whether the noise generated by the operation of the generator 10 is easily heard by the vehicle user O. More specifically, in a case where it is estimated that the current vehicle situation is a situation in which the noise of the generator 10 is easily heard by the vehicle user O (the vehicle user O is likely to feel uncomfortable due to the noise) based on the noise recognition degree suggestion amount, it is possible to suppress the noise by executing the diffusion mode. On the other hand, in a case where it is estimated that the current vehicle situation is a situation in which the noise is not easily heard by the vehicle user O (it is difficult for the vehicle user O to feel uncomfortable due to the noise) based on the noise recognition degree suggestion amount, the switching efficiency can be improved by executing the basic mode. That is, it is possible to suppress a state in which the diffusion mode is executed in a situation in which the noise caused by the operation of the generator 10 does not cause a problem (a state in which the loss increases).

Accordingly, even in the switching control applied to the generator 10 in which the driving point ($T_g$ and $N_g$) is determined independently of the traveling state of the vehicle, it is possible to suitably distinguish between a scene in which noise suppression is to be prioritized and a scene in which efficiency is to be prioritized, and it is possible to achieve an appropriate balance between both reduction of discomfort given to the vehicle user O due to the noise and suppression of deterioration of the fuel efficiency.

Further, the above-mentioned noise recognition degree suggestion amount includes an alighting possibility parameter (shift position signal $S_{sh}$ and pb state signal $S_{pb}$) that suggests an alighting possibility of the vehicle user O when the vehicle is stopped. In a case where it is determined that there is an alighting possibility based on the alighting possibility parameter, the recognition degree with respect to the noise is estimated to be high (Yes in either of step S110 or step S120).

Accordingly, it is possible to specify a situation in which the vehicle user O in the vehicle compartment $C_{in}$ goes out of the vehicle and approaches the generator 10 as the noise source (a situation in which the vehicle user O may feel uncomfortable with respect to noise) with reference to the alighting possibility parameter, and to estimate the situation as a situation in which the recognition degree is high. Therefore, in this situation, the diffusion mode is more reliably executed.

More specifically, the alighting possibility parameter includes a shift position selected in the vehicle and/or ON/OFF of the parking brake of the vehicle. In a case where the shift position is selected to a transmission cutoff range (P range or N range) in which transmission of a driving force between a traveling driving source (drive motor 12) and the driving wheel of the vehicle is cut off, and/or in a case where the parking brake is ON, it is determined that there is an alighting possibility.

Accordingly, a more specific mode of the alighting possibility parameter is realized. In particular, in a case where the shift position is selected to be the transmission cutoff range or in a case where the parking brake is ON, there is a strong correlation with a situation in which the vehicle is stopped and the alighting possibility of the vehicle user O is high (a stop situation for a predetermined time or more such as parking). Therefore, by estimating such a case as a situation in which the recognition degree of the vehicle user O with respect to the noise is high, it is possible to further improve determination accuracy of the control mode.

The above-mentioned noise recognition degree suggestion amount further includes a background noise parameter suggesting the magnitude of the background noise in the vehicle compartment $C_{in}$ caused by traveling of the vehicle, and a first shielding property parameter suggesting the shielding property against transmission of noise to the vehicle compartment $C_{in}$. In a case where it is determined that there is no alighting possibility based on the alighting possibility parameter (No in both step S110 and step S120), the level of the recognition degree with respect to the noise is estimated based on the background noise parameter and the first shielding property parameter.

Accordingly, on an assumption that there is no alighting possibility based on the above-mentioned alighting possibility parameter, a more preferable mode of the parameter is provided from the viewpoint of estimating the level of the recognition degree with respect to the noise of the vehicle user O in the vehicle compartment $C_{in}$ when the vehicle is traveling. That is, in a case where it is determined that there is no alighting possibility, it is possible to estimate the level of the recognition degree with respect to the noise from the viewpoint of a magnitude of a background noise caused by the traveling of the vehicle and how much the noise is transmitted to the vehicle compartment $C_{in}$, based on the background noise parameter and the first shielding property parameter.

More specifically, the above-mentioned background noise parameter includes the vehicle speed v. In addition, the first shielding property parameter includes the open and closed state (open and closed state signal $S_{win}$) of the window 62 of the vehicle. In a case where the vehicle speed v is equal to or lower than the predetermined vehicle speed threshold $V_{th}$ and the window is open, the recognition degree is estimated to be high (Yes in step S130 and Yes in step S140). On the other hand, in a case other than the above (No in step S130 or No in step S140), the recognition degree is estimated to be low.

Accordingly, more specific modes of the background noise parameter and the first shielding property parameter are realized. A magnitude of the vehicle speed v correlates with the magnitude of the background noise (traveling noise, wind noise, or the like) caused by traveling. Therefore, by using the vehicle speed v as the background noise parameter, the magnitude of the background noise in the vehicle compartment $C_{in}$ can be appropriately estimated. In addition, the open and closed state of the window 62 correlates with a physical shielding property of the noise transmission between the generator 10 as the noise source and the vehicle compartment $C_{in}$. Therefore, by using the open and closed state signal $S_{win}$ as the first shielding property parameter, a substantial magnitude of the noise transmitted into the vehicle compartment $C_{in}$ can be made appropriate.

Therefore, even in a scene (immediately before the start of traveling or during traveling) assuming that there is no alighting possibility as described above, it is possible to appropriately distinguish between a situation in which the recognition degree is high and a situation in which the recognition degree is low. As a result, even in this scene, a situation in which the diffusion mode is to be executed (a situation in which the noise caused by the operation of the generator 10 is to be suppressed) and a situation in which the basic mode is to be executed can be more appropriately distinguished.

In the present embodiment, in a case where an output torque of the generator 10 (generator torque $T_g$) is less than the predetermined threshold torque $T_{g\_th}$, the basic mode is executed, regardless of the estimation result of the level of the recognition degree based on the above-mentioned noise recognition degree suggestion amount (No in step S150, and step S160).

Accordingly, it is possible to suppress occurrence of a state in which the diffusion mode is executed in a scene in which the level of the noise generated by the operation of the generator 10 is small to an extent that does not cause a problem. Therefore, it is possible to further limit the scene in which the diffusion mode is to be executed (it is possible to increase an opportunity to execute the basic mode), and it is possible to obtain an effect of further suppressing deterioration in fuel efficiency.

In the diffusion mode according to the present embodiment, the fundamental frequency F0 and the diffusion frequency F1 are alternately set, the fundamental frequency F0 being a first frequency substantially equal to twice the control cycle t of the voltage command value $V_g^*$ calculated as a value of a voltage to be applied to the generator 10, and the diffusion frequency F1 being a second frequency that is an integral multiple of the first frequency.

Accordingly, it is possible to suppress the change in the difference (phase difference) between the switching timing of the carrier frequency fc and the update timing of the voltage command value $V_g^*$, and to suitably synchronize the carrier wave with the voltage command value $V_g^*$. Therefore, in the first switching device 14, it is possible to suppress the decrease in torque accuracy and the generation of a torque ripple at the time of switching the carrier frequency.

Further, in the present embodiment, the controller 50 is provided to function as a switching control device that is mounted on the vehicle including the generator 10 and the drive motor 12 for traveling that operates with the generated electric power of the generator 10, and adjusts the carrier frequency $f_{c1}$ of the carrier wave used for the PWM control for adjusting the electric power of the generator 10.

In particular, the controller 50 includes: a setting unit that sets, as the control mode of the carrier wave, either of the basic mode in which the carrier frequency $f_{c1}$ is maintained at a predetermined basic value (fundamental frequency F0) or the diffusion mode in which the carrier frequency $f_{c1}$ is changed at a predetermined switching cycle; an acquisition unit that acquires the noise recognition degree suggestion amount ($S_{sh}$, $S_{pb}$, v, and $S_{win}$) suggesting the vehicle situation correlated with the level of the recognition degree of the vehicle user O with respect to the noise generated by the operation of the generator 10; and a control mode determination unit. In a case where the above-mentioned recognition degree is estimated to be high based on the noise recognition degree suggestion amount (Yes in either of step S110 and step S120 or Yes in both step S130 and step S140), the control mode determination unit executes the diffusion mode (step S170). On the other hand, in a case where the above-mentioned recognition degree is estimated to be low (No in both step S110 and step S120 and No in either of step S130 or step S140), the basic mode is executed (step S160).

As a result, a configuration of the control device suitable for executing the switching control method of the present embodiment is realized.

Second Embodiment

Hereinafter, a second embodiment will be described. The same elements as those in the first embodiment are denoted by the same reference numerals, and descriptions thereof will be omitted. In particular, in the present embodiment, an example will be described in which a second shielding property parameter suggesting a level of the shielding property of noise transmission between the inverter 13 and the vehicle exterior region $C_{out}$ is used as the noise recognition degree suggestion amount.

Figure 5:
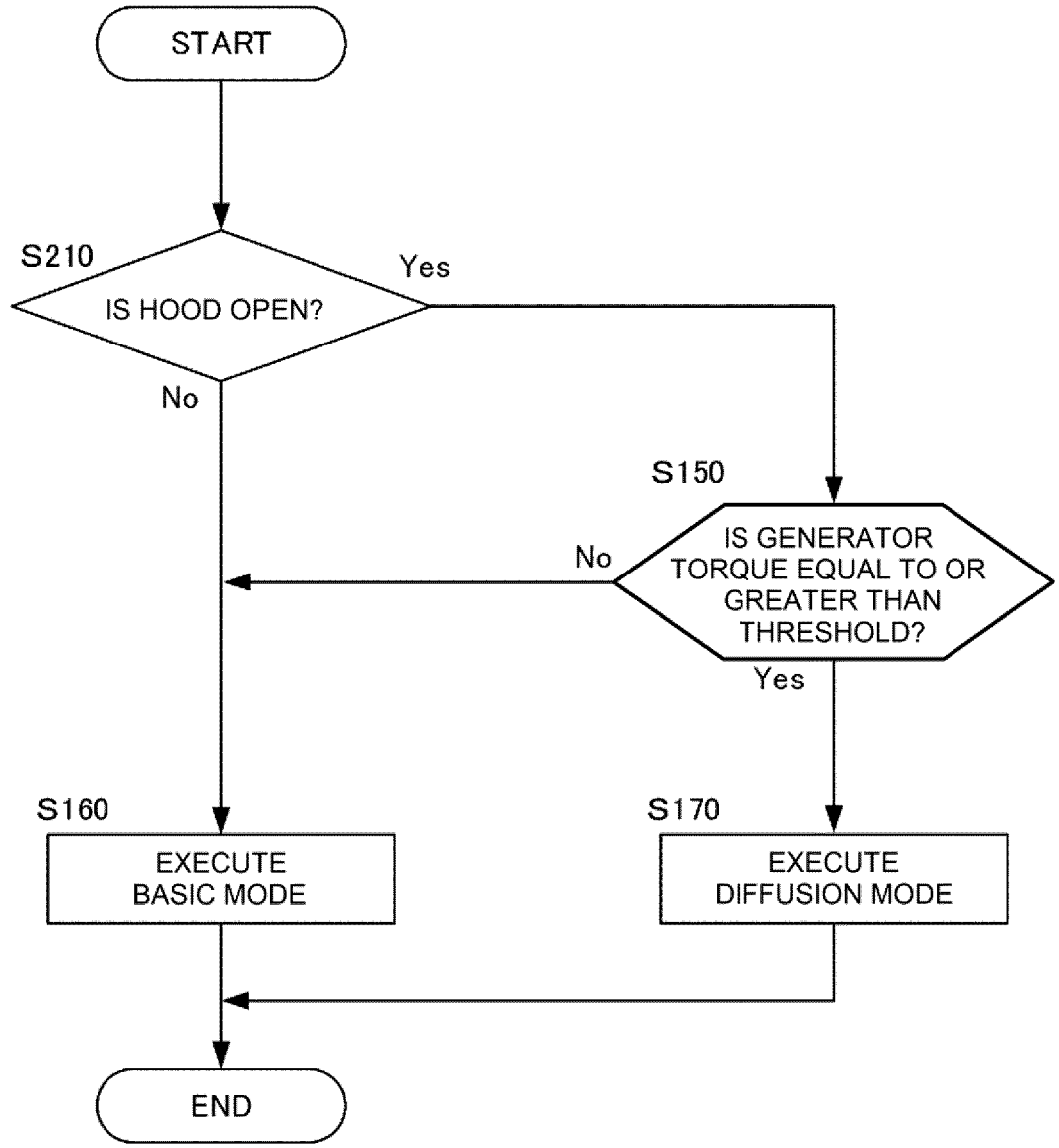
FIG. 5 is a flowchart illustrating an execution determination process according to a second embodiment.

FIG. 5 is a flowchart illustrating an execution determination process according to the present embodiment.

As illustrated in the drawing, in step S210, whether the engine hood 64 is open is determined with reference to a signal indicating an open and closed state of the engine hood 64. The open and closed state of the engine hood 64 can be detected by known sensors (not illustrated).

Here, the determination in step S210 is executed to estimate whether the shielding property of the noise transmission between the inverter 13 and the vehicle exterior region $C_{out}$ is equal to or higher than a reference for distinguishing the level of the recognition degree of the vehicle user O in the vehicle exterior region $C_{out}$ on an assumption that the vehicle is stopped. That is, in the present embodiment, a signal indicating open and closed information of the engine hood 64 is used as the second shielding property parameter described above. In particular, the signal indicating the open and closed information of the engine hood 64 functions as an appropriate index for estimating the level of the shielding property against noise transmission from the inverter 13 to the vehicle exterior region $C_{out}$.

Figure 6:
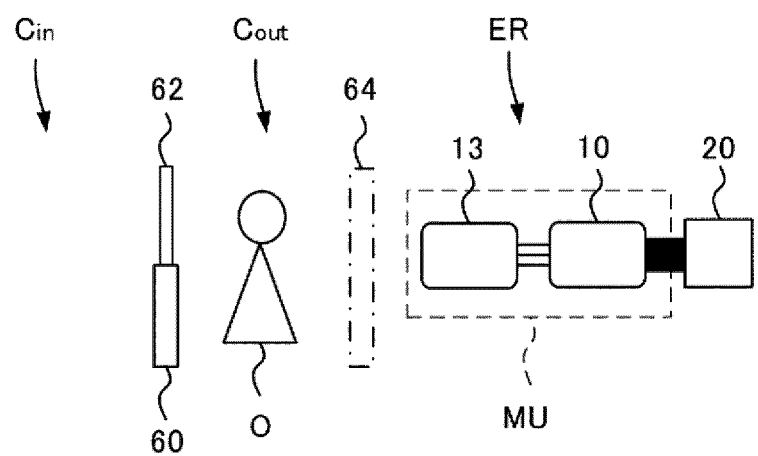
FIG. 6 is a diagram illustrating a correlation between an open and closed state of an engine hood and the level of the recognition degree for noise of the vehicle user.

FIG. 6 is a diagram illustrating a relation between the open and closed information of the engine hood 64 and the recognition degree for noise in the vehicle exterior region $C_{out}$.

As illustrated in the drawing, when the engine hood 64 is open, there is substantially no shield that shields noise transmission between the vehicle exterior region $C_{out}$ and the electric motor unit MU in the engine room ER. That is, in a state illustrated in FIG. 6, the noise generated by the operation of the generator 10 is directly transmitted to the vehicle user O without passing through the engine hood 64. Therefore, in this state, it can be said that for the vehicle user O who is in the vehicle exterior region $C_{out}$, a state in which the engine hood 64 is open is a state in which the recognition degree with respect to the noise is high as compared to a state in which the engine hood 64 is closed. That is, the open and closed state of the engine hood 64 appropriately correlates with the level of the recognition degree for noise in the vehicle exterior region $C_{out}$.

In the switching control method of the present embodiment described above, the noise recognition degree suggestion amount includes the second shielding property parameter suggesting the shielding property against the transmission of noise between the electric motor unit MU (generator 10) and the external region of the vehicle (vehicle exterior region $C_{out}$). In a case where it is determined that the shielding property is equal to or less than a certain value based on the second shielding property parameter, the recognition degree with respect to the noise is estimated to be high (Yes in step S210).

Accordingly, a more preferable mode of the parameter is provided from the viewpoint of estimating the level of the recognition degree with respect to the noise of the vehicle user O in the vehicle exterior region $C_{out}$. In particular, it is possible to estimate the level of the recognition degree with respect to the noise from the viewpoint of how much a substantial magnitude of the noise is heard by the vehicle user O in the vehicle exterior region $C_{out}$ based on the second shielding property parameter.

More specifically, the above-mentioned second shielding property parameter includes an open and closed state of an opening and closing member (engine hood 64) that opens and closes an accommodation space (engine room ER) inside the vehicle body accommodating the generator 10 and the first switching device 14 with respect to the external region (vehicle exterior region $C_{out}$).

Accordingly, as the above-mentioned second shielding property parameter, one specific mode of the second shielding property parameter suitably correlated with a degree of the noise transmission between the electric motor unit MU as the noise source and the vehicle exterior region $C_{out}$ (the substantial magnitude of the noise heard by the vehicle user O) is realized on an assumption that the vehicle user O is located in the vehicle exterior region $C_{out}$. In particular, a state in which the engine hood 64 is open is normally a situation on an assumption that the vehicle is stopped and in which there is a probability that the vehicle user O is located in the vehicle exterior region $C_{out}$ in order to perform some work or confirmation.

Therefore, by referring to the open and closed state of the engine hood 64, it is possible to omit settings of individual parameters for understanding whether the vehicle is stopped, whether the vehicle user O is located in the vehicle exterior region $C_{out}$, and the level of the shielding property against the noise transmission between the electric motor unit MU and the vehicle exterior region $C_{out}$. That is, by setting the second shielding property parameter to the open and closed state of the engine hood 64, it is possible to estimate the level of the recognition degree of the vehicle user O with respect to the noise by a simple control logic.

Although the embodiments of the present invention have been described, the above embodiments are merely a part of application examples of the present invention, and do not mean that the technical scope of the present invention is limited to the specific configurations of the above embodiments.

For example, a configuration may be adopted in which an operation state of the generator 10 is monitored, the execution determination process is executed in a case where the generator 10 is operating, and the control mode is maintained in the basic mode without executing the execution determination process in a case where the generator 10 is not operating. In addition, on an assumption of a case where the recognition degree of the vehicle user O with respect to the noise is estimated to be high (Yes in either of step S110 and step S120, or Yes in both step S130 and step S140), a configuration may be adopted in which the operation state of the generator 10 is confirmed, and the diffusion mode is executed only at the time of the operation. With any control configuration, it is possible to more reliably suppress an increase in loss (deterioration in fuel efficiency) due to execution of the diffusion mode in a scene in which a request for noise suppression is low (a scene in which the level of the noise caused by the operation of the generator 10 is low).

Further, a configuration may be adopted in which, for estimation of the level of the recognition degree with respect to the noise, a plurality of parameters that function as the noise recognition degree suggestion amount are used, and the threshold torque $T_{g\_th}$ (step S150) to be compared with the generator torque $T_g$ is changed in accordance with an estimation result of the level of individual recognition degrees by the respective parameters or a combination thereof.

More specifically, the disclosure range of the present description also includes a switching control method, the switching control method including:

executing magnitude comparison between the generator torque $T_g$ and the predetermined threshold torque $T_{g\_th}$ when the recognition degree is estimated to be high based on the plurality of parameters (shift position, ON/OFF of parking brake, vehicle speed v, opening and closing of window, and/or opening and closing of engine hood 64) that function as the noise recognition degree suggestion amount, executing the diffusion mode in a case where the generator torque $T_g$ is equal to or greater than the threshold torque $T_{g\_th}$, and executing the basic mode even when the recognition degree is estimated to be high in a case where the generator torque $T_g$ is less than the threshold torque $T_{g\_th}$, in the switching control method, the threshold torque $T_{g\_th}$ is changed in accordance with the estimation result of the level of the individual recognition degrees of the respective parameters or the combination thereof.

Accordingly, for example, by referring to the level of the individual recognition degrees of the respective parameters, even in a situation in which the recognition degree is similarly estimated to be high, it is possible to distinguish between a situation in which the recognition degree is relatively high and a situation in which the recognition degree is relatively low, and increase or reduce the threshold torque $T_{g\_th}$. In particular, in the situation in which the recognition degree is relatively high, the basic mode is less likely to be executed in the determination of step S150 by reducing the threshold torque $T_{g\_th}$, and the noise suppression can be prioritized. Conversely, in the situation in which the recognition degree is relatively low, the basic mode is easily executed by increasing the threshold torque $T_{g\_th}$, and the fuel efficiency can be prioritized.

For example, it is estimated that a first scene is a state in which the recognition degree with respect to the noise is relatively low as compared to a second scene, in the first scene, the recognition degree with respect to the noise is estimated to be high based on the opening and closing of the window during traveling (Yes in step S140), and in the second scene, the vehicle user O opens the engine hood 64 and approaches the noise source while the vehicle is stopped (Yes in step S210). Therefore, by setting the threshold torque $T_{g\_th}$ to be relatively small in the second scene in which the recognition degree is estimated to be high based on a second parameter, which is the opening and closing of the engine hood 64, as compared to the first scene in which the recognition degree is estimated to be high based on a first parameter, which is the opening and closing of the window, it is possible to achieve a more preferable balance between the noise suppression and the fuel efficiency.

The specific mode of the noise recognition degree suggestion amount is not limited to that described in the above-mentioned embodiment. That is, as the noise recognition degree suggestion amount, any parameter can be adopted as long as the parameter functions as a suggestion amount of the vehicle situation that can correlate with the level of the recognition degree of the vehicle user O with respect to the noise caused by the operation of the generator 10.

The invention claimed is:

1. A switching control method for adjusting, in a vehicle including a generator and a drive motor for traveling that operates with generated electric power of the generator, a carrier frequency of a carrier wave used for PWM control for adjusting the electric power of the generator, the switching control method comprising:
   setting, as a control mode of the carrier wave, either of a basic mode in which the carrier frequency is maintained at a predetermined basic value or a diffusion mode in which the carrier frequency is changed at a predetermined switching cycle;
   acquiring a noise recognition degree suggestion amount suggesting a vehicle situation correlated with a level of a recognition degree of a vehicle user with respect to noise generated by an operation of the generator;
   executing the diffusion mode in which the carrier frequency is changed at a predetermined switching cycle in a case where the recognition degree is estimated to be high based on the noise recognition degree suggestion amount; and
   executing the basic mode in which the carrier frequency is maintained at a predetermined basic value in a case where the recognition degree is estimated to be low, wherein
   the noise recognition degree suggestion amount includes an alighting possibility parameter that suggests an alighting possibility of the vehicle user when the vehicle is stopped, and
   in a case where it is determined that there is an alighting possibility based on the alighting possibility parameter, the recognition degree is estimated to be high.

2. The switching control method according to claim 1, wherein
   the alighting possibility parameter includes a shift position selected in the vehicle and/or ON/OFF of a parking brake of the vehicle, and
   in a case where the shift position is selected to be a transmission cutoff range in which transmission of a driving force between a traveling driving source and a driving wheel of the vehicle is cut off, or in a case where the parking brake is ON, it is determined that there is an alighting possibility.

3. The switching control method according to claim 2, wherein
   the noise recognition degree suggestion amount further includes a background noise parameter that suggests a magnitude of background noise in a vehicle compartment caused by traveling of the vehicle, and a first shielding property parameter that suggests a shielding property against transmission of the noise to the vehicle compartment, and
   in a case where it is determined that there is no alighting possibility based on the alighting possibility parameter, the level of the recognition degree is estimated based on the background noise parameter and/or the first shielding property parameter.

4. The switching control method according to claim 3, wherein
   the background noise parameter includes a vehicle speed, the first shielding property parameter includes an open and closed state of a window of the vehicle, and
   in a case where the vehicle speed is equal to or lower than a predetermined vehicle speed threshold and the window is open, the recognition degree is estimated to be high, and otherwise, the recognition degree is estimated to be low.

5. The switching control method according to claim 4, wherein
   in a case where a magnitude of an output torque of the generator is less than a predetermined threshold torque, the basic mode is executed regardless of an estimation result of the level of the recognition degree based on the noise recognition degree suggestion amount.

6. The switching control method according to claim 5, wherein
   in the diffusion mode, a first frequency and a second frequency are alternately set, the first frequency substantially matching twice a control cycle of a voltage command value calculated as a value of a voltage to be applied to the generator, and the second frequency being an integral multiple of the first frequency.

7. A switching control method for adjusting, in a vehicle including a generator and a drive motor for traveling that operates with generated electric power of the generator, a carrier frequency of a carrier wave used for PWM control for adjusting the electric power of the generator, the switching control method comprising:

setting, as a control mode of the carrier wave, either of a basic mode in which the carrier frequency is maintained at a predetermined basic value or a diffusion mode in which the carrier frequency is changed at a predetermined switching cycle;

acquiring a noise recognition degree suggestion amount suggesting a vehicle situation correlated with a level of a recognition degree of a vehicle user with respect to noise generated by an operation of the generator;

executing the diffusion mode in which the carrier frequency is changed at a predetermined switching cycle in a case where the recognition degree is estimated to be high based on the noise recognition degree suggestion amount; and executing the basic mode in which the carrier frequency is maintained at a predetermined basic value in a case where the recognition degree is estimated to be low, wherein the noise recognition degree suggestion amount includes a second shielding property parameter suggesting a shielding property against transmission of the noise between the generator and an external region of the vehicle when the vehicle is stopped, and in a case where it is determined that the shielding property is equal to or lower than a certain value based on the second shielding property parameter, the recognition degree is estimated to be high.

8. The switching control method according to claim 7, wherein the second shielding property parameter includes an open and closed state of an opening and closing member configured to open and close an accommodation space inside a vehicle body accommodating the generator with respect to the external region.

9. The switching control method according to claim 7, wherein in a case where a magnitude of an output torque of the generator is less than a predetermined threshold torque, the basic mode is executed regardless of an estimation result of the level of the recognition degree based on the noise recognition degree suggestion amount.

10. The switching control method according to claim 7, wherein in the diffusion mode, a first frequency and a second frequency are alternately set, the first frequency substantially matching twice a control cycle of a voltage command value calculated as a value of a voltage to be applied to the generator, and the second frequency being an integral multiple of the first frequency.

11. A switching control device that is mounted on a vehicle including a generator and a drive motor for traveling that operates with generated electric power of the generator, and adjusts a carrier frequency of a carrier wave used for PWM control for adjusting the electric power of the generator, the switching control device comprising:

a setting unit configured to set, as a control mode of the carrier wave, either of a basic mode in which the carrier frequency is maintained at a predetermined basic value or a diffusion mode in which the carrier frequency is changed at a predetermined switching cycle;

an acquisition unit configured to acquire a noise recognition degree suggestion amount suggesting a vehicle situation correlated with a level of a recognition degree of a vehicle user with respect to noise generated by an operation of the generator; and a control mode determination unit configured to execute the diffusion mode in a case where the recognition degree is estimated to be high based on the noise recognition degree suggestion amount, and execute the basic mode in a case where the recognition degree is estimated to be low, wherein the noise recognition degree suggestion amount includes an alighting possibility parameter that suggests an alighting possibility of the vehicle user when the vehicle is stopped, and the control mode determination unit is configured to estimate that the recognition degree is high in a case where it is determined that there is an alighting possibility based on the alighting possibility parameter.

\* \* \* \* \*